(12) United States Patent
Killick et al.

(10) Patent No.: US 8,649,773 B2
(45) Date of Patent: Feb. 11, 2014

(54) SYSTEM AND APPARATUS TO SUPPORT CLIPPED VIDEO TONE ON TELEVISIONS, PERSONAL COMPUTERS, AND HANDHELD DEVICES

(75) Inventors: Raynald Hammerton Killick, Alpharetta, GA (US); Vivek Shankar Srivastav, Suwanee, GA (US); Aaron Lionel Lynch, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/215,446

(22) Filed: Aug. 23, 2011

(65) Prior Publication Data

US 2013/0052997 A1 Feb. 28, 2013

(51) Int. Cl.
*H04M 1/725* (2006.01)
(52) U.S. Cl.
USPC .................. 455/412.1; 455/466; 455/412.2
(58) Field of Classification Search
USPC .............. 455/466, 412, 412.1, 41.2; 709/216, 709/246
See application file for complete search history.

(56) References Cited

U.S. PATENT DOCUMENTS

| | | | |
|---|---|---|---|
| 6,505,169 B1 * | 1/2003 | Bhagavath et al. | 705/14.66 |
| 2005/0143103 A1 * | 6/2005 | Bjorgan et al. | 455/466 |
| 2006/0031297 A1 * | 2/2006 | Zuidema | 709/206 |
| 2006/0041470 A1 * | 2/2006 | Filho et al. | 705/14 |
| 2008/0153520 A1 * | 6/2008 | Kirtane | 455/466 |
| 2011/0076995 A1 | 3/2011 | Kim | |
| 2011/0258271 A1 * | 10/2011 | Gaquin | 709/206 |
| 2011/0296472 A1 * | 12/2011 | Soldan et al. | 725/81 |

FOREIGN PATENT DOCUMENTS

EP 1 826 985 A1 8/2007

OTHER PUBLICATIONS

European Invitation to Pay Additional Fees dated Oct. 31, 2012 cited in Application No. PCT/US2012/051723, 6 pgs.
International Search Report dated Jan. 8, 2013 cited in Application No. PCT/US2012/051723, 17 pgs.

* cited by examiner

*Primary Examiner* — Manpreet Matharu
(74) *Attorney, Agent, or Firm* — Merchant & Gould

(57) ABSTRACT

Media content communication may be provided. First, an incoming communication may be received at a subscriber device. A determination whether multimedia content is associated with the incoming communication may then be made. The multimedia content may be associated with, for example, a caller, and may be played back as a video tone indicating a communication originating from the caller. The multimedia content may also be delivered with the incoming communication, retrieved by the subscriber device, and played back upon acceptance of the incoming communication or stored for later retrieval upon denial of the incoming communication.

26 Claims, 3 Drawing Sheets

SYSTEM AND APPARATUS TO SUPPORT CLIPPED VIDEO TONE ON TELEVISIONS, PERSONAL COMPUTERS, AND HANDHELD DEVICES

BACKGROUND

Often times, marketers initiate mass telephonic communications to telecommunication service subscribers in the form of 'robocalls'. Once these communications are answered, audio content initiates playback and the called party listens to the conveyed audio content with their communications device. With the growing popularity of smartphones, more telecommunication service subscribers now have the capability to playback audiovisual content with their communications device. However, audiovisual content is not currently conveyed in the same way as, for example, audio content is conveyed with 'robocalls'.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
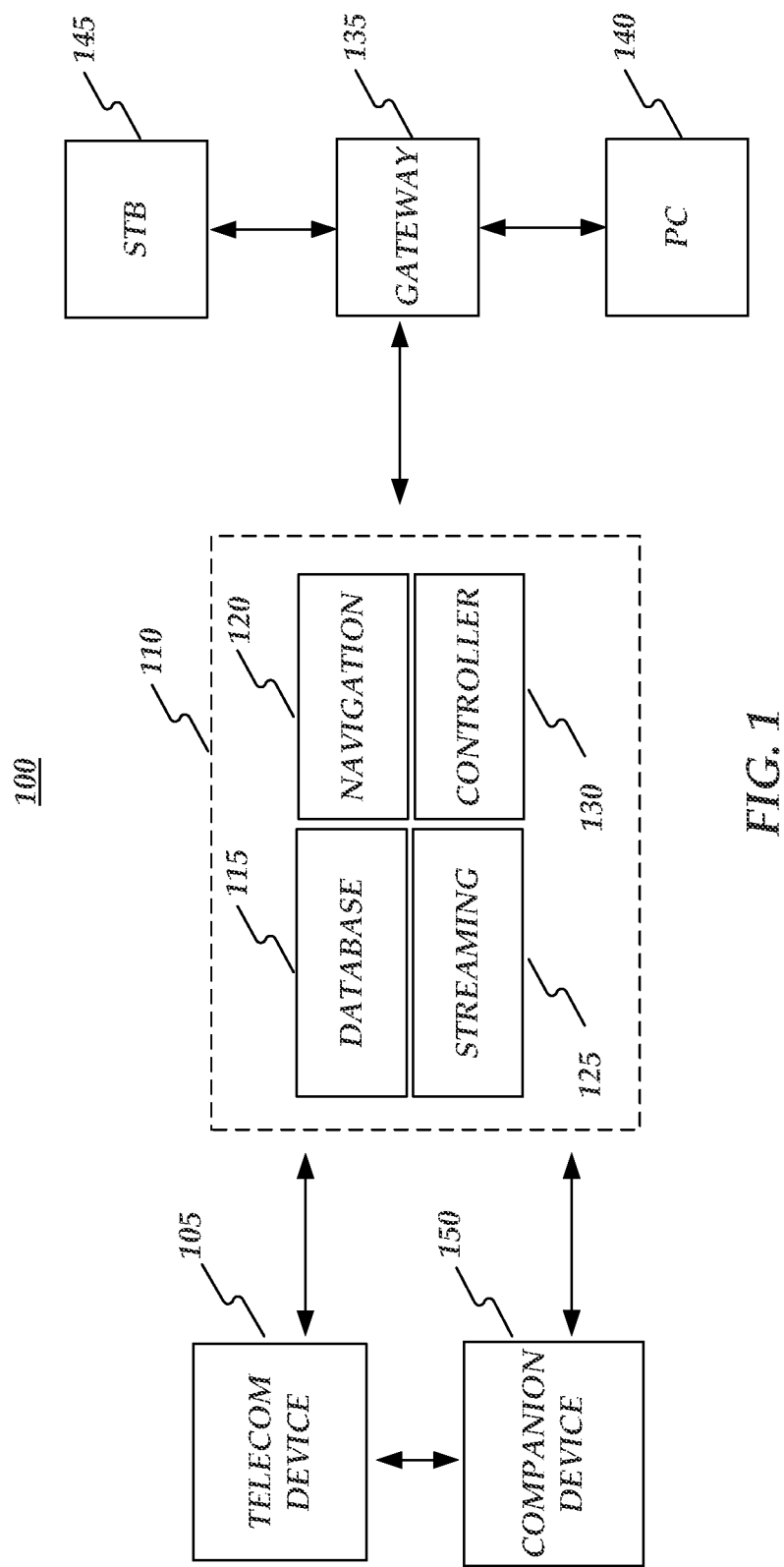
FIG. 1 is a block diagram of an operating environment.

Media content communication may be provided. First, an incoming communication may be received at a subscriber device. A determination whether multimedia content is associated with the incoming communication may then be made. The multimedia content may be associated with, for example, a caller, and may be played back as a video tone indicating a communication originating from the caller. The multimedia content may also be delivered with the incoming communication, retrieved by the subscriber device, and played back upon acceptance of the incoming communication or stored for later retrieval upon denial of the incoming communication.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure.

Multimedia content communication may be provided. Embodiments of the disclosure may enable a caller (e.g., a subscriber to a telecommunications service) to send multimedia content to a recipient (e.g., another subscriber to the telecommunications service). For example, the caller may deliver multimedia content, such as a video clip, along with a phone call to the recipient. Upon acceptance of the phone call, the recipient's telecommunications device may playback the multimedia content delivered from the caller. In this way, callers, such as telemarketers, may provide subscribers with, for example, audiovisual advertisements through telephonic communications.

Consistent with embodiments of the disclosure, the recipient's telecommunications device may be configured to playback multimedia content upon receiving a telecommunication from a designated caller. For example, the recipient may select multimedia content, such as a video clip, to be played back as a ringtone, or 'video' tone, upon receiving an incoming call from the designated caller. In addition, the recipient's device may be configured to playback multimedia content selected by the caller upon receiving a telecommunication from the caller. For example, the recipient's device may display a business card associated with the caller when receiving the incoming call.

Communicated multimedia content may be displayed at the receiving device while a call is in progress (e.g. in a picture-in-picture display of a television or on a screen of the recipients device), before the call is answered (e.g., as a multimedia 'video tone' or in addition to an existing 'ring tone'), or after the call has been made (e.g., as a multimedia message). In various embodiments, the multimedia content may be sent directly as a multimedia message. In this scenario, embodiments may provide for an inbox that is capable of storing the communicated multimedia content communicated for later retrieval by the recipient.

In yet other embodiments, a companion device in communication with the recipient's telecommunications device may playback multimedia content communicated to the recipient's telecommunications device. For example, the recipient's telecommunication device may receive multimedia content from a caller via a telephone call. Once the recipient accepts the telephone call, the multimedia content may be played back at the companion device while the recipient communicates with the caller on the telecommunications device. In this way, the multimedia content playback may be transferred from the recipient's telecommunications device to the companion device. Similarly, a video tone, initially playing on the recipient's device, may continue to play on the companion device once the recipient has accepted the incoming call at the telecommunications device. In various embodiments, the companion device may be any device that has access to networked multimedia content tied to the recipient's telecommunications device.

FIG. 1 is a block diagram of an operating environment 100. As shown in FIG. 1, operating environment 100 may comprise a telecommunications device 105, service provider equipment 110, a gateway 135, a personal computer (PC) 140, and a set-top box (STB) 145. Operating environment 100 may also include a companion device 150. Telecommunications device 105 may include, for example, mobile phones, handheld devices, computers, set-top boxes, tablets and other computing devices capable of telecommunication. Companion device 150 may be another computing device in communication with telecommunications device 105. Companion device 150 may have similar telecommunications and multimedia functionality as telecommunications device 105. Service provider equipment 110 may include a networked database 115, a multimedia navigation module 120, a multimedia steaming module 125, and a headend controller 130.

A user of a telecommunications device 105 (e.g., a subscriber to the telecommunications service) may communicate useful information through multimedia content delivered along with a telecommunication, such as a phone call. The multimedia content may comprise, but is not limited to, for example, video clips, advertisements, movie previews, business cards, and other audiovisual content that a caller may wish to be communicated with a telecommunication. The telecommunication may be, but is not limited to, a phone call, a video call, a multimedia message, or any other form of network data/voice communication. Although the disclosure may describe multimedia content communication in the context of phone calls, data/voice calls, video calls, or multimedia messaging, any applicable electronic communication may be used, including cross-platform communication.

Service provider equipment 110 may be hosted by, for example, a telecommunications service provider that provides a number of different telecommunications services, such as digital cable, Internet, and both wired and wireless telephonic services.

Thus, service provider equipment 110 may be configured to provide and share the multimedia content to and between the service provider's subscribers of various platforms. For example, digital cable service subscribers to service provider 110 may have access to the same multimedia content as other types of telecommunication service subscribers to the service provider. Moreover, telecommunication subscribers may share multimedia content with digital cable subscribers and vice versa. Multimedia content providers, such as advertising and marketing agencies, may agree with the service provider regarding the delivery of corresponding multimedia content to recipients. For example, the multimedia content providers may request that the multimedia content be delivered at a time of call initiation or a later time, via a subscriber inbox or call log.

In some embodiments, the multimedia content may be stored on a subscriber device, such as telecommunications device 105, and communicated from one device to another. In various other embodiments, the multimedia content may be stored at networked database 115 operatively tied to service provider equipment 110. In this way, multimedia content stored at networked database 115 may be communicated from one subscriber to another without requiring subscriber devices to locally store the communicated content. Multimedia streaming module 125 may be configured to stream the multimedia content directly to subscriber devices, such as telecommunications device 105, PC 140, and STB 145, when the multimedia content is not stored locally on the subscriber devices. Similarly, multimedia streaming module 125 may be configured to stream the multimedia content to companion devices (e.g. companion device 150).

Consistent with embodiments, the multimedia content may be compiled into, for example, a catalog stored on networked database 115 and may be accessible by all of the subscribers of the service provider. A subscriber may access networked database 115 through multimedia navigation module 120 in order to navigate through the catalog and choose multimedia content to, for example, purchase or otherwise access. The content may be subsequently streamed to the subscriber by multimedia streaming module 125 or otherwise provided to the subscriber by headend controller 130.

Communication between PC 120, STB 145, and service provider equipment 110 may be linked through gateway 135. Gateway 130 may be operative to convert communications from service provider equipment 110 to a protocol that is understood by PC 140 and STB 145. In this way, telecommunications device 105 may communicate and share multimedia content with PC 140 and STB 145 via service provider equipment 110.

Figure 2:
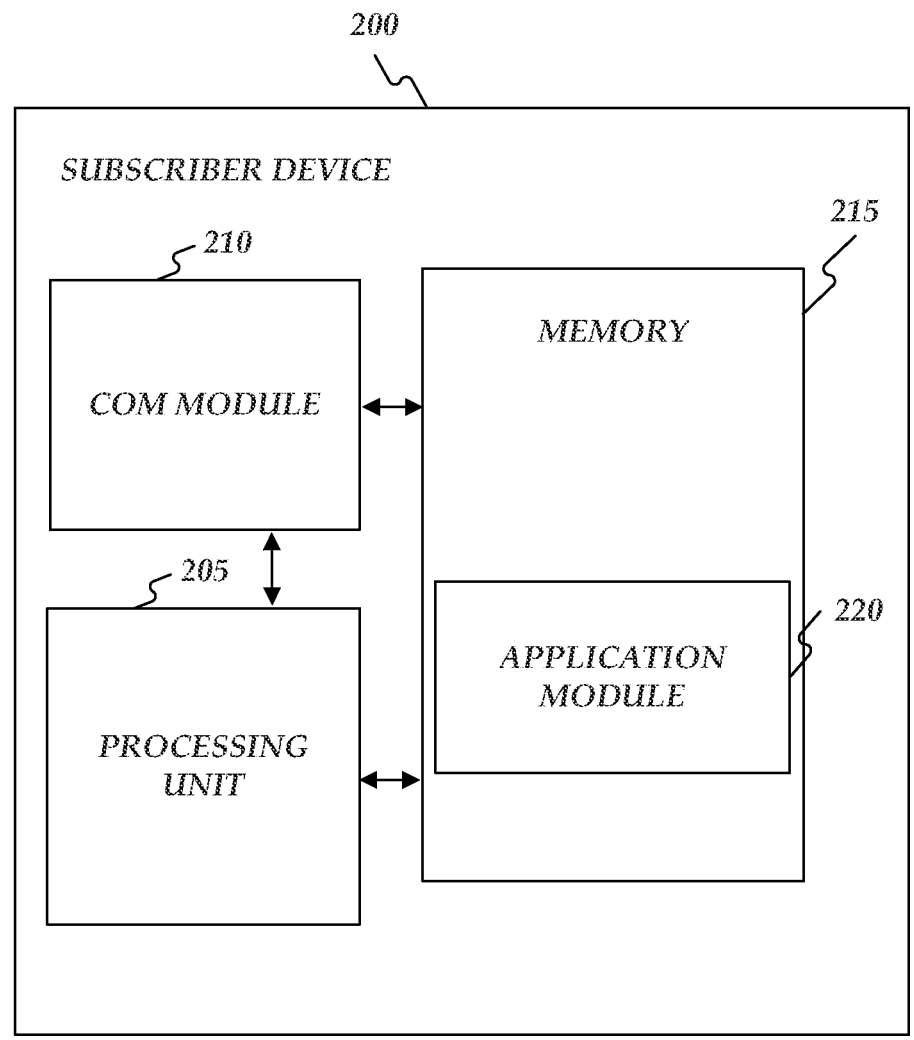
FIG. 2 is a block diagram of a subscriber device.

FIG. 2 is a block diagram of a subscriber device 200. Subscriber device 200 may comprise, for example, an operating environment for telecommunications device 105, PC 140, or STB 145. Subscriber device 200 may comprise a processing unit 205 operatively tied to a communication module 210, and a memory 215. Communication module 210 may provide communications between subscriber device 200 and service provider 110 over, for example, a network in a distributed computing environment. By way of example, and not limitation, communication processes interfacing with communication module 210 may include wired processes such as a wired network or direct-wired connection, and wireless processes such as acoustic, radio frequency (RF), infrared, and other wireless media.

Memory 215 may comprise any computer storage media, such as volatile and nonvolatile, removable and non-removable media implemented in any method or technology for storage of information, such as computer readable instructions, data structures, program modules, or other data. Computer storage media may include, but is not limited to, random access memory (RAM), read only memory (ROM), electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by subscriber device 200. Any such computer storage media may be part of subscriber device 200. The term computer readable media as used herein may include both storage media and communication media.

Memory 215 may store, for example, an operating system and one or more programming modules. The operating system, for example, may be suitable for controlling subscriber device 200's operation. Furthermore, memory 215 of subscriber device 200 may comprise an application module 220. Application module 220 may be operative to enable subscriber device 200 to interface with networked database 115, multimedia navigation module 120, multimedia steaming module 125, and headend controller 130. For example, application module 220 may enable subscriber device to receive multimedia content in conjunction with other telecommunications, store, playback, and retrieve the multimedia content.

Application module 220 may further enable subscriber device 200 to access an inbox, which may reside either locally on subscriber device 200 or remotely at service provider equipment 110. The inbox may store multimedia messages communicated to a corresponding subscriber.

Moreover, while executing on processing unit 205, application module 220 may perform processes for providing multimedia content communication, including for example, one or more stages from method 300 described below with respect to FIG. 3. Though subscriber device 200 is shown to have the aforementioned components, other components may be included in subscriber device 200 such as input/output components, display components, and other components.

Figure 3:
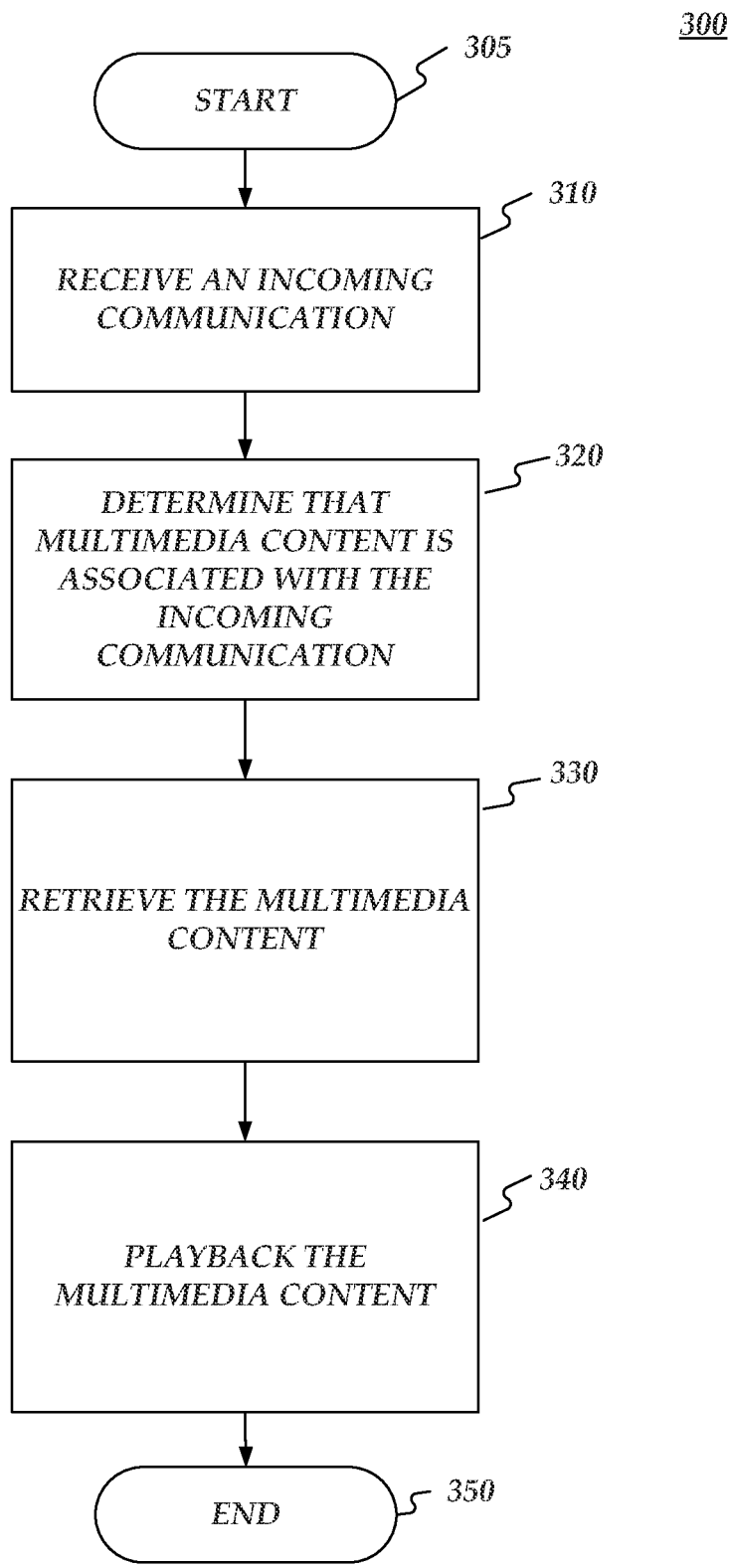
FIG. 3 is a flow chart of a method for providing multimedia content communication.

FIG. 3 is a flow chart setting forth the general stages involved in a method 300 consistent with an embodiment of the disclosure for providing multimedia content communication. Method 300 may be implemented using subscriber device 200 as described in more detail above with respect to FIG. 2.

Method 300 may begin at starting block 305 and proceed to stage 310 where subscriber device 200 may receive an incoming communication. The incoming communication may originate from, for example, a service provider and may provide the subscriber with useful multimedia content. However, in various embodiments, any subscriber to the service provider may initiate a multimedia communication and may attach multimedia content to the communication. For example, using robocalls, a calling party may communicate to the subscriber a set of movie previews, as well as other types of advertisements, in the form of video clips.

From stage 310, where subscriber device 200 receives the incoming communication, method 300 may advance to stage 320 where subscriber device 200 may determine that multimedia content is associated with the incoming communication. Multimedia content may be associated with incoming communications in a number of ways. In some embodiments, multimedia content, such as a video clip or business card, may be tied to a caller. In this way, when the subscriber receives the incoming communication from the caller, subscriber device 200 may display the multimedia content upon receiving the incoming communication. The tie between the caller and the corresponding multimedia content may be made at either the calling device, the receiving device, or by the service provider.

As disclosed above, a subscriber may select to have the multimedia content set as a 'video tone' for incoming calls received at the subscriber's device. In other words, the subscriber's device may retrieve and playback multimedia content, such as a video clip, upon receiving incoming calls. The subscriber may further customize the multimedia content playback to be associated with, for example, an incoming call from a particular caller or an alert tone associated with a particular event.

In other embodiments, and as will be discussed in greater detail below, multimedia content may be delivered along with the incoming communication. For example, the incoming communication may initiate a playback of the multimedia content on subscriber device 200 when the incoming communication is accepted by the subscriber.

Once subscriber device 200 determines that multimedia content is associated with the incoming communication in stage 320, method 300 may continue to stage 330 where subscriber device 200 may retrieve the multimedia content. In various embodiments, the incoming communication may deliver a link to the receiving device along with the communication. The link may reference content that is stored in networked database 115.

For example, a calling subscriber may send, to a receiving subscriber, a uniform resource locator (URL) to multimedia content stored in networked database 115. The communicated content may be communicated independently through, for example, a multimedia message, or, for example, in conjunction with a data or voice call. The receiving subscriber's device may receive the URL with the phone call and access the multimedia content stored in the networked database through the URL. The multimedia content may be streamed to the receiving device by multimedia streaming module 125 and, in this way, may be an alternative to subscribe devices communicating the actual multimedia content between each other.

In other embodiments, subscriber device 200 may be operative to retrieve multimedia content from an inbox where delivered multimedia content may be stored. Multimedia content may be directly sent to the recipient's inbox or, alternatively, be stored in the recipient's inbox if the incoming communication is not accepted. Still in other embodiments, subscriber device 200 may retrieve the multimedia content directly from an entity that initiated the incoming communication.

After subscriber device 200 retrieves the multimedia content in stage 330, method 300 may proceed to stage 340 where subscriber device 200 may playback the multimedia content. For example, subscriber device 200 may follow the link provided with the incoming communication and stream, from multimedia streaming module 125, the multimedia content. Upon playing the multimedia content, subscriber device 200 may be configured to pause, rewind, and fast-forward the multimedia content.

In various embodiments, subscriber device 200 may not need to accept the incoming communication to playback the multimedia content. For example, the multimedia content may be played while the incoming communication is being alerted to the subscriber. In addition, the multimedia content of the incoming communication may be forwarded to the inbox and, as it is received at the inbox, subscriber device 200 may playback the multimedia content in a picture-in-picture (PIP) display so as to allow the subscriber to continue using subscriber device 200. In this scenario, the subscriber may elect to enlarge the PIP display at any time during the multimedia content's playback.

In addition, a call log may be provided. The call log may provide a listing of incoming and outgoing calls associated with subscriber device 200. In addition, the call log may list the corresponding multimedia content associated with the incoming and outgoing calls. In this way, a subscriber may, upon selection of a particular call in the call log, playback the multimedia content associated with the call anytime the subscriber accesses the call log.

Call log may be stored locally on subscriber device 200 and be accessed at any time. However, in various other embodiments, the call log may be stored remotely at service provider equipment 110, tied to the subscriber's account, and accessed remotely by the subscriber. Thus, subscriber device 200, in conjunction with application module 220, may remotely access the call log.

Similarly, companion device 150, as described above, or any other device operative to access to the networked call log, may view and playback the multimedia content listed in the call log such as, for example, a status or image retrieved from a social networking site or a multimedia rich advertisement. In this way, the subscriber may access and playback the multimedia content communicated from and to subscriber device 200 from any device having access to the networked call log. Once subscriber device 200 plays back the multimedia content in stage 340, method 300 may then end at stage 350.

An embodiment consistent with the disclosure may comprise a system for providing multimedia content communication. The system may comprise a memory storage and a processing unit coupled to the memory storage. The processing unit may be operative to receive an incoming communication; determine that multimedia content is associated with the incoming communication; retrieve, in response to determining that the incoming communication is associated with multimedia content, the multimedia content; and play back the retrieved multimedia content.

Another embodiment consistent with the disclosure may comprise a system for providing multimedia content communication. The system may comprise a memory storage and a processing unit coupled to the memory storage. The processing unit may be operative to receive an incoming call at a telecommunications device; determine that multimedia content is associated with the incoming call; retrieve, in response to determining that the incoming call is associated with multimedia content, the multimedia content; and play back the retrieved multimedia content.

Yet another embodiment consistent with the disclosure may comprise a system for providing multimedia content communication. The system may comprise a memory storage and a processing unit coupled to the memory storage. The processing unit may be operative to receive an incoming communication; determine an origin of the incoming communication; determine whether multimedia content is associated with the incoming communication based on the origin of the incoming communication; determine whether the multimedia content is associated with the incoming communication based on a link delivered with the incoming communication; retrieve the multimedia content; when the multimedia content is associated with the incoming communication based on the origin of the incoming call; playback the multimedia content prior to an acceptance of the incoming communication; and when the multimedia content is associated with the incoming communication based on a link delivered with the incoming communication, playback the multimedia content upon the acceptance of the incoming communication.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the disclosure, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving an incoming communication at a mobile telecommunications device from a caller, the incoming communication having multimedia content tied to the incoming communication by a service provider;
determining that the multimedia content is associated with the incoming communication, the mobile telecommunications device being configured to playback the multimedia content as one of the following: an indicator of a receipt of the incoming communication at the mobile telecommunications device and a content of the incoming communication;
retrieving, in response to determining that the incoming communication is associated with the multimedia content, the multimedia content;
playing back the retrieved multimedia content the mobile communications device;
determining that the incoming communication is accepted by a user of the mobile communications device; and
in response to determining that the incoming communication is accepted, playing the multimedia content on a companion device while the user is communicating with the caller on the mobile telecommunication device.

2. The method of claim 1, wherein receiving the incoming communication comprises receiving at least one of the following: a voice communication, a data communication, and a multimedia message at a telecommunications device.

3. The method of claim 1, wherein determining that the multimedia content is associated with the incoming communication comprises determining that the incoming communication is associated with a link to the multimedia content.

4. The method of claim 3, wherein retrieving the multimedia content comprises following the link to retrieve the multimedia content.

5. The method of claim 1, wherein determining that the multimedia content is associated with the incoming communication comprises determining that the incoming communication originates from a caller associated with the multimedia content.

6. The method of claim 5, wherein playing back the retrieved multimedia content comprises playing back a video tone when the incoming call originates from the caller associated with the multimedia content.

7. The method of claim 1, wherein playing back the retrieved multimedia content comprises at least one of the following: playing back the multimedia content when the incoming call is accepted and playing back the multimedia content through a call log.

8. The method of claim 1, wherein playing back the retrieved multimedia content comprises playing back the multimedia content before the incoming call is accepted.

9. The method of claim 1, wherein playing back the retrieved multimedia content comprises streaming the multimedia content from a service provider.

10. The method of claim 1, wherein playing back the retrieved multimedia content comprises displaying at least one of the following: an advertisement, a video clip, and a business card.

11. A method comprising:
receiving a selection of multimedia content from a caller;
attaching the multimedia content to an outgoing call initiated by the caller; and
communicating the multimedia content along with the outgoing call, the multimedia content being playable at a recipient device as one of the following: an indicator of a receipt of an incoming communication at the recipient device and a content of the incoming communication, wherein the multimedia content is played until the outgoing call is accepted by a user of the recipient device, and wherein when the outgoing call is accepted by the user, the multimedia content is played on a companion device while the user is communicating with the caller on the mobile telecommunication device.

12. The method of claim 11, wherein receiving the selection of the multimedia content comprises receiving the selection from a multimedia catalog.

13. The method of claim 11, wherein attaching the multimedia content comprises attaching a uniform resource locator (URL) to the outgoing call, the URL pointing to the multimedia content stored at a service provider.

14. The method of claim 11, wherein communicating the multimedia content along with the outgoing call comprises streaming the multimedia content from a remote database.

15. An apparatus comprising:
a memory storage; and
a processing unit coupled to the memory storage, the processing unit being configured to:
configure multimedia content to be communicated with an outgoing call, the multimedia content being playable at a recipient device as one of the following: an indicator of a receipt of the outgoing call at the recipient device and a content of the outgoing call;
place an outgoing call initiated by a caller; and
communicate the multimedia content with the outgoing call, wherein the multimedia content is tied to the outgoing call by at a service provider, wherein the multimedia content is played on the recipient device until the outgoing call is accepted by a user of the recipient device, and wherein when the outgoing call is accepted by the user, the multimedia content is played on a companion device while the user is communicating with the caller on the recipient device.

16. The apparatus of claim 15, wherein the multimedia content comprises an electronic business card configured to be displayed at a recipient's telecommunications device.

17. The apparatus of claim 15, wherein the multimedia content is streamed from a remote database to a recipient of the outgoing call.

18. The apparatus of claim 15, wherein the processing unit being configured to communicate the multimedia content with the outgoing call comprises the processing unit being configured to attach a uniform resource locator (URL) to the outgoing call, the URL pointing the multimedia content stored at a remote database.

19. An apparatus comprising:
a memory storage; and
a processing unit coupled to the memory storage, the processing unit being configured to:
receive an incoming communication on a recipient device, the incoming communication having multimedia tied to the incoming communication by a service provider,
determine an origin of the incoming communication,
determine whether the multimedia content is associated with the incoming communication based on the origin of the incoming communication,
determine whether the multimedia content is associated with the incoming communication based on a link delivered with the incoming communication,
retrieve the multimedia content,
when the multimedia content is associated with the incoming communication based on the origin of the incoming call, playback the multimedia content on the recipient device prior to an acceptance of the incoming communication by a user of the recipient device, the multimedia content being played back as an indicator of the incoming communication,
when the multimedia content is associated with the incoming communication based on a link delivered with the incoming communication, playback the multimedia content upon the acceptance of the incoming communication, the multimedia content being played back as a content of the incoming communication; and
wherein when the outgoing call is accepted by the user, the multimedia content is played on a companion device while the user is communicating with a caller on the recipient device.

20. The apparatus of claim 19, wherein the multimedia content comprises at least one of the following: an advertisement, a video clip, and a business card.

21. The apparatus of claim 19, wherein the link leads to a database maintained at a service provider.

22. The apparatus of claim 19, wherein the processing unit being operative to playback the multimedia content comprises the processing unit being operative to stream the multimedia content from the service provider.

23. The apparatus of claim 19, wherein the incoming communication comprises at least one of the following: a voice communication, a data communication, and a multimedia message.

24. The apparatus of claim 19, wherein the multimedia content is stored, after retrieval, in the memory storage and is accessible by a call log.

25. The method of claim 1, wherein receiving the incoming communication at a mobile telecommunications device comprises receiving the incoming communication from a digital cable subscriber.

26. The method of claim 11, communicating the multimedia content along with the outgoing call comprises communicating the multimedia content from a digital cable subscriber device to a telecommunications mobile device.

\* \* \* \* \*